(12) United States Patent
Koch et al.

(10) Patent No.: US 7,577,641 B2
(45) Date of Patent: Aug. 18, 2009

(54) COMPUTER-IMPLEMENTED SYSTEM AND METHOD FOR ANALYZING SEARCH QUERIES

(75) Inventors: Donald O. Koch, Apex, NC (US); David C. Pope, Raleigh, NC (US); Kevin L. Scott, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 240 days.

(21) Appl. No.: 10/935,734

(22) Filed: Sep. 7, 2004

(65) Prior Publication Data

US 2006/0053095 A1    Mar. 9, 2006

(51) Int. Cl.
*G06F 17/30*    (2006.01)
(52) U.S. Cl. .............. 707/3; 707/10; 707/5; 707/6; 707/102
(58) Field of Classification Search .............. 707/3, 707/10, 6
See application file for complete search history.

(56) References Cited

U.S. PATENT DOCUMENTS

| | | | |
|---|---|---|---|
| 5,873,080 A * | 2/1999 | Coden et al. .............. 707/3 |
| 6,282,537 B1 * | 8/2001 | Madnick et al. .............. 707/4 |
| 6,345,271 B1 * | 2/2002 | Dempsey et al. .............. 707/4 |
| 6,430,553 B1 | 8/2002 | Ferret |
| 6,523,022 B1 * | 2/2003 | Hobbs .............. 707/3 |
| 6,654,735 B1 | 11/2003 | Eichstaedt et al. |
| 6,668,251 B1 * | 12/2003 | Goldberg .............. 707/5 |
| 6,718,324 B2 * | 4/2004 | Edlund et al. .............. 707/5 |
| 6,745,178 B1 * | 6/2004 | Emens et al. .............. 707/3 |
| 6,834,276 B1 * | 12/2004 | Jensen et al. .............. 707/2 |
| 7,146,359 B2 * | 12/2006 | Castellanos .............. 707/5 |
| 7,158,986 B1 * | 1/2007 | Oliver et al. .............. 707/102 |
| 7,266,559 B2 | 9/2007 | Cook et al. |
| 2001/0032205 A1 * | 10/2001 | Kubaitis .............. 707/10 |
| 2002/0046053 A1 * | 4/2002 | Hare et al. .............. 705/1 |
| 2002/0073075 A1 * | 6/2002 | Dutta et al. .............. 707/3 |
| 2002/0143933 A1 | 10/2002 | Hind et al. |
| 2003/0018799 A1 * | 1/2003 | Eyal .............. 709/231 |
| 2003/0055816 A1 | 3/2003 | Paine et al. |
| 2003/0171977 A1 | 9/2003 | Singh et al. |
| 2003/0191754 A1 * | 10/2003 | Dey et al. .............. 707/3 |
| 2003/0229537 A1 * | 12/2003 | Dunning et al. .............. 705/10 |
| 2004/0220925 A1 * | 11/2004 | Liu et al. .............. 707/3 |
| 2004/0225647 A1 * | 11/2004 | Connelly et al. .............. 707/3 |
| 2006/0004716 A1 * | 1/2006 | Hurst-Hiller et al. .............. 707/3 |
| 2006/0190355 A1 * | 8/2006 | Jammes et al. .............. 705/27 |
| 2007/0162442 A1 * | 7/2007 | Brill et al. .............. 707/5 |

OTHER PUBLICATIONS

:ktmatu:relax, http://ktmatu.com/software/relax (61 pp.).

* cited by examiner

*Primary Examiner*—Cam Y T Truong
(74) *Attorney, Agent, or Firm*—Jones Day (57) ABSTRACT

Systems and methods for handling input search engine data. A data store is searched based upon one or more data items contained within the input search engine data. The result of searching the data store is used to determine which data items in the input search engine data might be a search term. Search terms are extracted based upon the result of searching the data store.

14 Claims, 11 Drawing Sheets

$search_parm{"q"} = 1;
$search_parm{"qt"} = 1;
$search_parm{"qry"} = 1;
$search_parm{"qkw"} = 1;
$search_parm{"query"} = 1;
$search_parm{"querytext"} = 1;
$search_parm{"p"} = 1;
$search_parm{"/.*txt.*/"} = 1;
$search_parm{"Keywords"} = 1;
$search_parm{"keywords"} = 1;
$search_parm{"KeyWords"} = 1;
$search_parm{"key_word"} = 1;
. . .

HASH

400

$search_parm{"key"} = 1;
$search_parm{"userQuery"} = 1;
$search_parm{"userquery"} = 1;
$search_parm{"term"} = 1;
$search_parm{"terms"} = 1;
$search_parm{"Name"} = 1;
$search_parm{"name"} = 1;
$search_parm{"s"} = 1;
$search_parm{"rawto"} = 1;

HASH

COMPUTER-IMPLEMENTED SYSTEM AND METHOD FOR ANALYZING SEARCH QUERIES

TECHNICAL FIELD

This document relates generally to handling search queries and more particularly to computer-implemented systems and methods for processing web-based search engine queries.

BACKGROUND

Each day Internet users submit an inordinate number of requests to search engines, such as Yahoo!®, Google™, Ask Jeeves®, etc. Search requests contain information that, if processed properly, can provide insight into the purchasing habits and other user characteristics of interest to businesses.

Current search request processing tends to be inefficient, such as the extraction process of search terms from search requests. For example, the extraction of search terms from click-stream referrer search engines may include coding IF-THEN conditional expressions for each search engine and placing these expressions in large and cumbersome IF-THEN-ELSE blocks.

SUMMARY

In accordance with the teachings provided herein, systems and methods are provided for operation upon a data processing device for handling input search engine data. As an example of a system and method, a data store is searched based upon one or more data items contained within input search engine data. The result of searching the data store is used to determine which data items in the input search engine data might be a search term. Search terms are extracted based upon the result of searching the data store.

DETAILED DESCRIPTION

Figure 1:
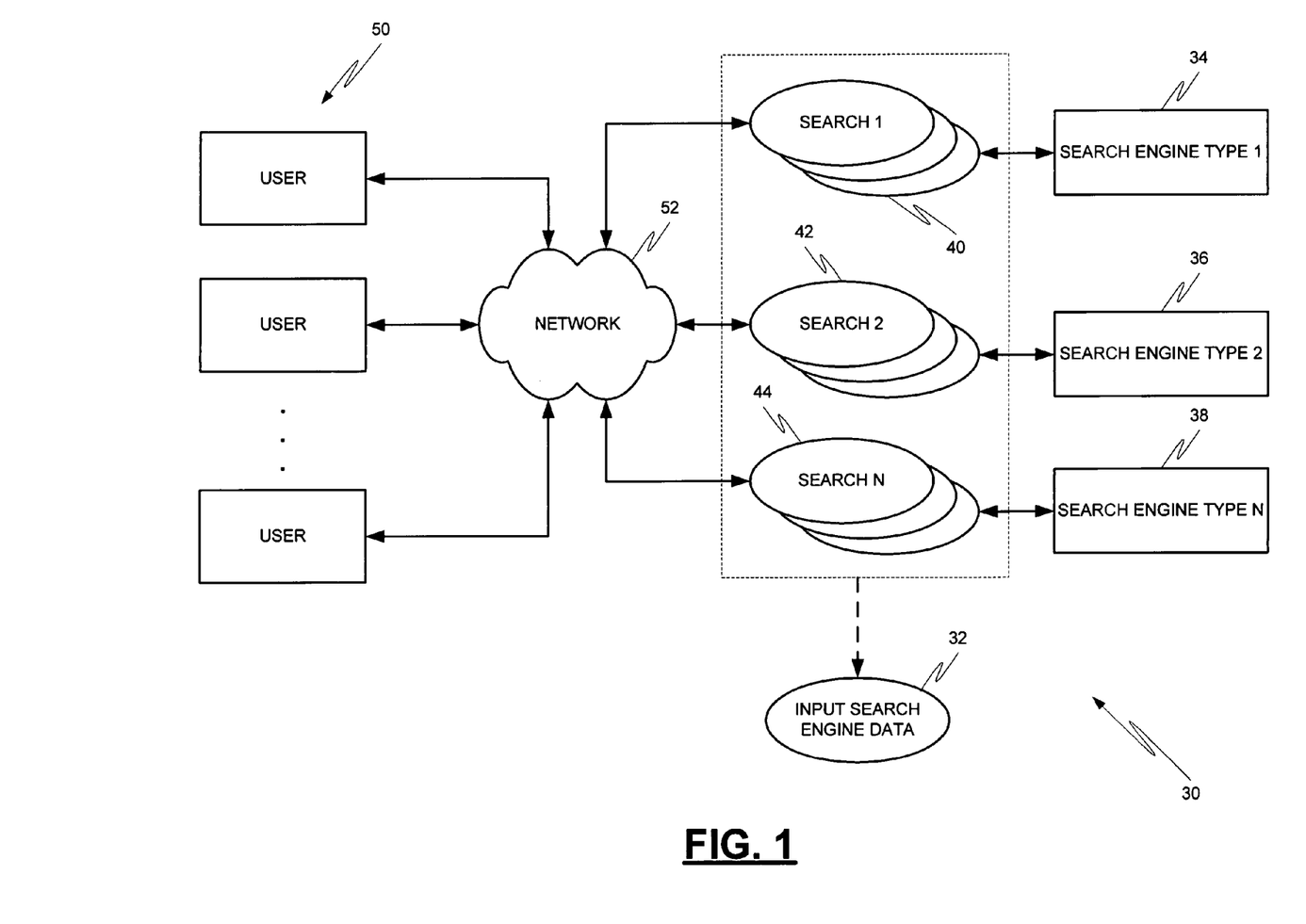
FIGS. 1 and 2 are block diagrams depicting software and computer components utilized in extracting search terms from input search engine data.
Figure 2:
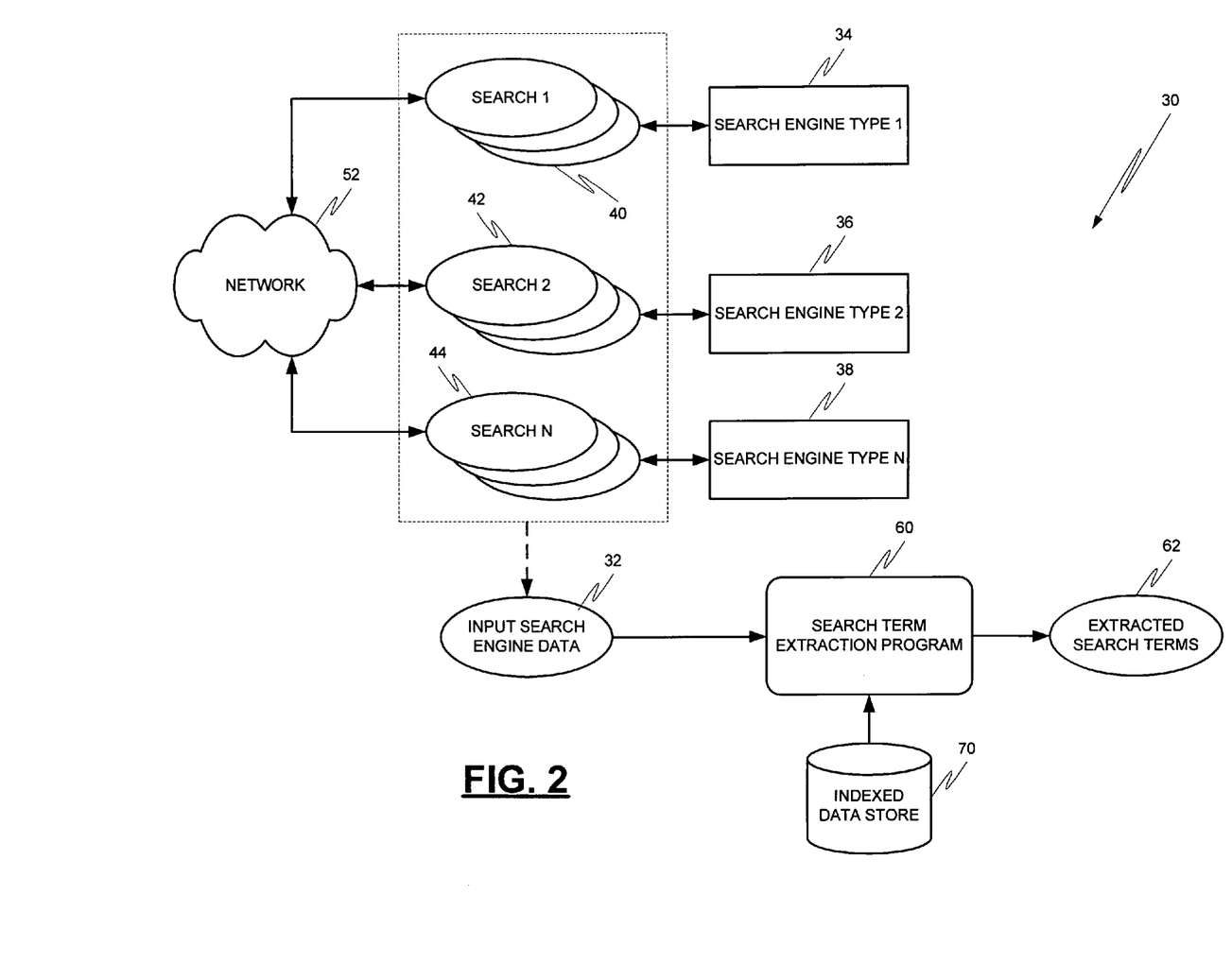

FIGS. 1 and 2 depict at 30 a computer-implemented system that collects input search engine data 32 from a variety of different search engine types (34, 36, 38). Different types of search engines may include Yahoo!®, Google™, Ask Jeeves®, a manufacturing company's proprietary search engine, etc. The search engines (34, 36, 38) may specify that different formats and identifiers be used for search terms within their respective user query strings (40, 42, 44). The user query strings (40, 42, 44) that form the input search engine data 32 are captured from the interaction of users 50 (e.g., persons or computer programs) with one or more search engines (34, 36, 38) over a network 52.

Network 52 may comprise a number of different types of networks. These include, but are not limited to, local area networks (LANs), wide area networks (WANs), Internet networks, and regional networks accessed over telephone lines, such as commercial information services.

Computers of the users 60 can execute web browser programs such as the Navigator, Explorer, or Mosaic browser programs, to locate web pages of the search engines (34, 36, 38). The browser programs allow the users 60 to enter addresses of specific web pages to be retrieved. These addresses are referred to as Uniform Resource Locators (URLs).

As shown in FIG. 2, the input search engine data 32 is provided to a computer program 60 that extracts search terms 62 from the input search engine data 32. The extraction computer program 60 can process separately the query strings (40, 42, 44) from the search engines (34, 36, 38) or can process all of the input search engine data collected from the different search engines (34, 36, 38) at the same time.

To identify which data items in the input search engine data 32 are search terms, the extraction computer program 60 searches an indexed data store 70 based upon the data items contained within the input search engine data 32. The result of searching the indexed data store 70 is used to determine what search terms (if any) exist within the input search engine data 32. The extraction program 60 outputs the search terms 62 located in the input search engine data 32 based upon the result of searching the indexed data store 70.

Figure 3:
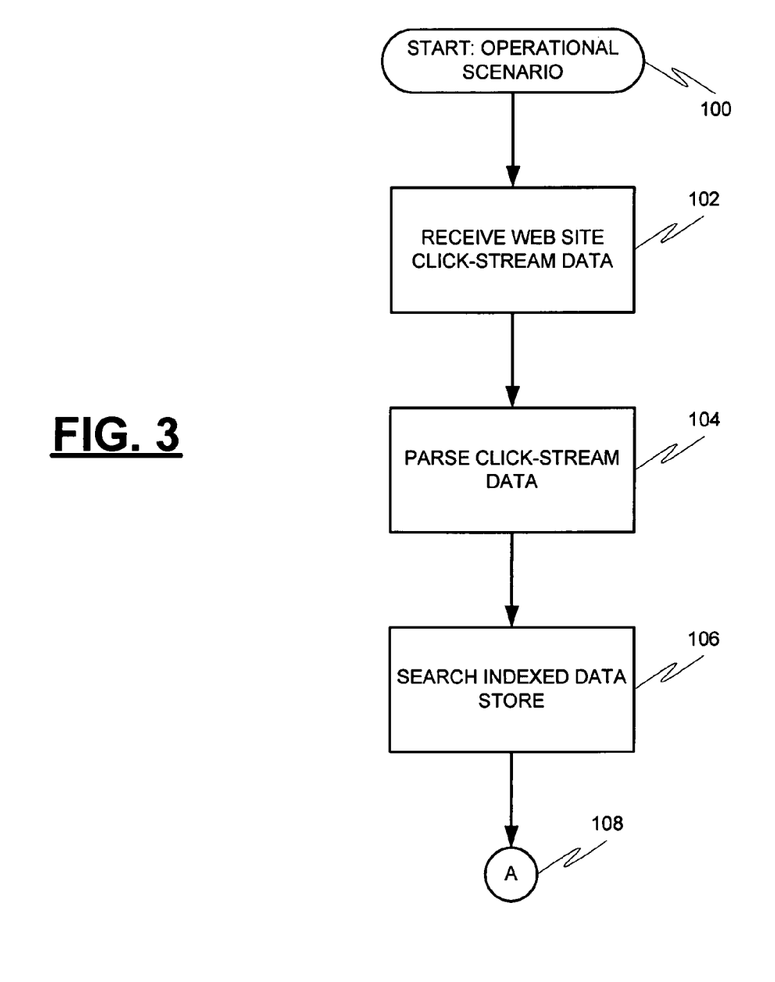
FIGS. 3 and 4 are flowcharts depicting an operational scenario for extracting search terms from click-stream data.
Figure 4:
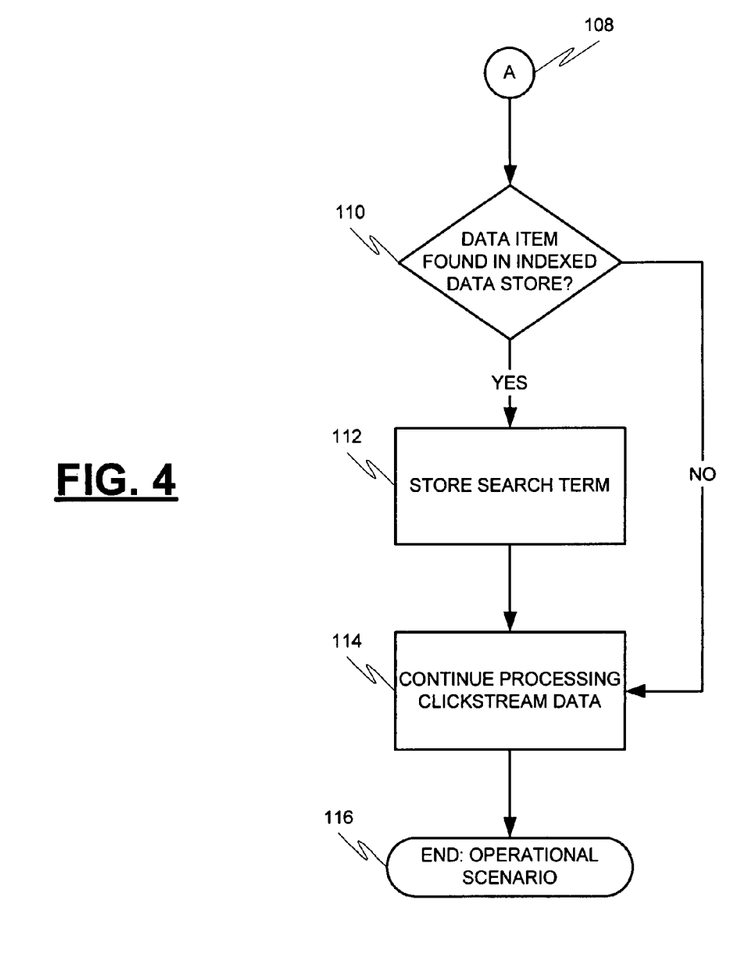

FIGS. 3 and 4 depict an operational scenario for extracting search terms from click-stream data. Start block 100 indicates that step 102 receives web site click-stream data whose search terms need to be extracted. The click-stream data contains in this operational scenario query strings associated with a referrer URL (or uniform resource identifier). Step 104 processes the name/value pairs of a query string associated with a referrer URL. Step 106 heuristically determines which name/value pairs from the query string actually contain search terms by analyzing the name/value pairs against an indexed data store to determine whether the value should be considered as a valid search term. Processing continues on FIG. 4 as indicated by continuation marker 108.

With reference to FIG. 4, decision step 110 examines whether a data item (e.g., a name or value) from a query string was found in the indexed data store. If it was not found, then the data item (or its associated pair data) is not considered a search term and processing continues at step 114 wherein the remainder of the click-stream data is analyzed in a similar fashion for search engine terms.

However if a data item is found in the indexed data store as determined by decision step 110, then a search term is determined to have been found and is stored at step 112 for later analysis. The click-stream data continues to be processed at step 114 by searching the indexed data store. The operational scenario terminates at end block 116. Such an operational scenario illustrates the extraction of search engine search terms directly from the query string associated with a referrer without having to maintain a list of known search engines.

Figure 5:
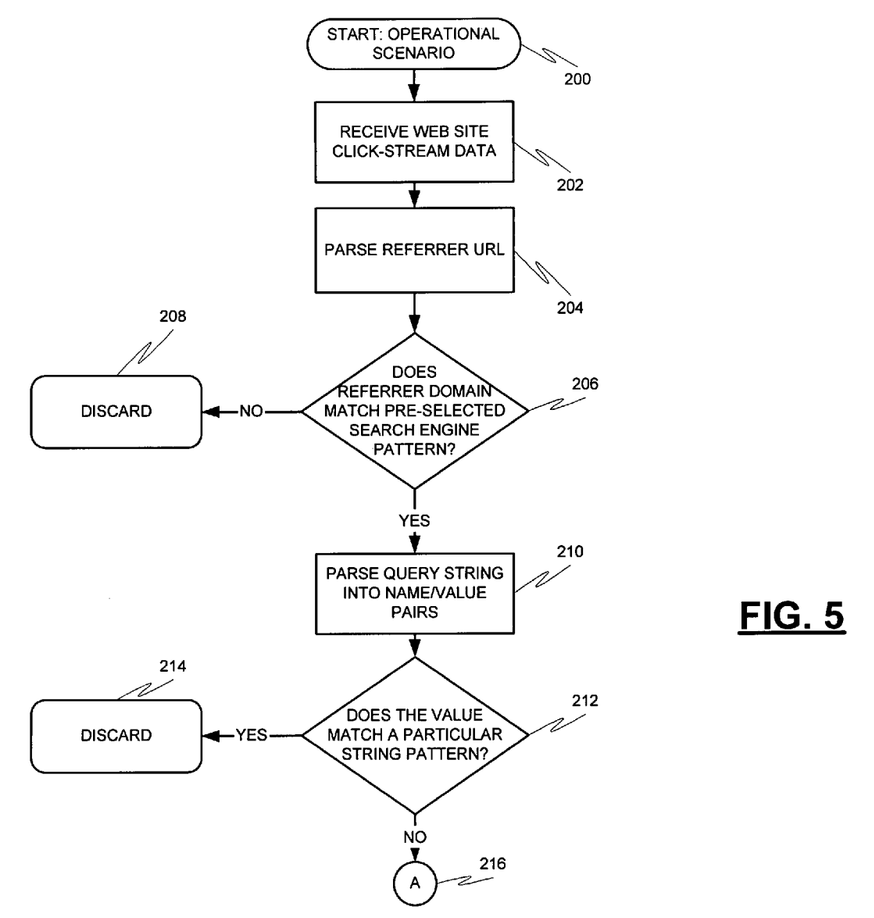
FIGS. 5 and 6 are flowcharts depicting an operational scenario for extracting search terms from click-stream data using multiple tests.

It should be understood that similar to the other processing flows described herein, the steps and the order of the steps in the flowchart described herein may be altered, modified, deleted, and/or augmented and still achieve the desired outcome. As an illustration, FIG. 5 provides another illustrative operational scenario for handling input search engine data. The operational scenario of the FIG. 5 illustrates the extracting of search engine search terms from click-stream data based on processing the name/value pairs of the query string associated with a referrer URL. The operational scenario determines which name/value pairs from the query string actually contains a search term by analyzing the name/value pairs against a set of rules to determine whether the value should be considered as a valid search term.

With reference to FIG. 5, start block 200 indicates that at step 202 web site click-stream data is received for processing. An example of click-stream data may include a referrer URL (or identifier) as follows:

* "http://www.google.com/search?hl=en&ie=UTF-8&oe=UTF8&q=sas+software&btnG=Google+Search"

The query string in this example follows the formatting and protocol of the hypertext transfer protocol (HTTP). However, it should be understood that an operational scenario may involve other formats and/or protocols where search term extraction is needed.

Figure 7:
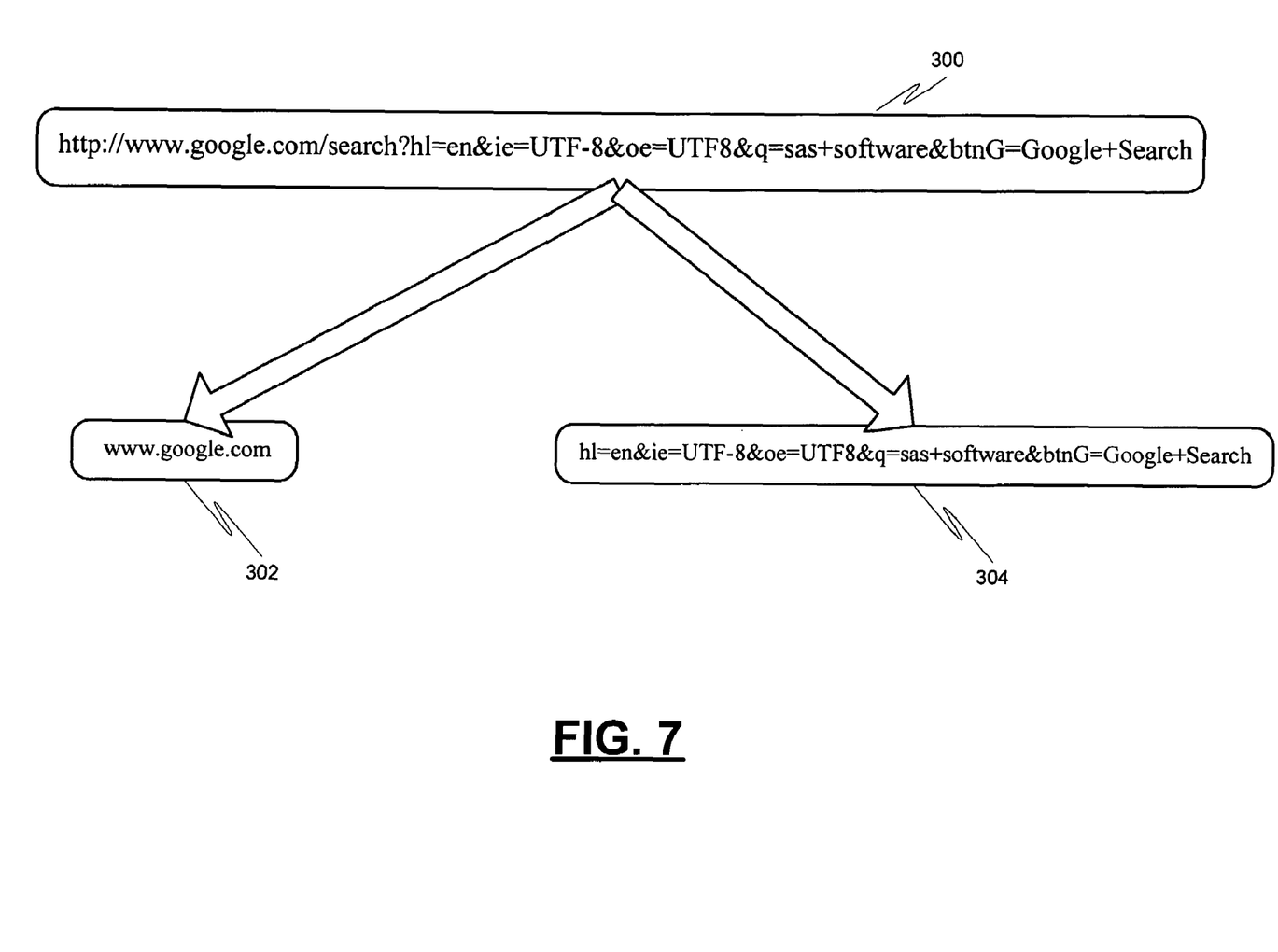
FIG. 7 is a flow diagram depicting parsing of a referrer uniform resource locator (URL).

At step 204, the referrer URL is parsed in order to identify the subcomponents contained within the referrer URL. Parsing can be done as shown in FIG. 7 wherein the referrer URL 300 is parsed into a referrer domain subcomponent 302 and a query string subcomponent 304. The parsed subcomponents are examined and/or further parsed so that tests can be performed upon the parsed information to determine whether any search engine terms can be identified.

However, it should be understood that parsing may be performed in many different ways. As an illustration, the referrer URL may be parsed into a protocol string (e.g., "http"), a domain string, a stem string, and a query string.

Decision step 206 examines whether the referrer domain string matches a pre-selected search engine pattern. For example, if a referrer domain contains "google", then the referrer domain matches a known search engine domain. If the referrer domain does not match a known search engine pattern, then the name/value pair is discarded from consideration at 208.

However if the referrer domain does match a known search engine pattern, then the query string is parsed into name/value pairs at step 210. For the instant example, the parsing of the query string "h1=en&ie=UTF-8&oe=UTF8&q=sas+software&btnG=Google+Search" results in the following name/value pairs:

h1=en
ie=UTF-8
oe=UTF8
q=sas+software
btnG=Google+Search

In a name/value pair, the name appears before the "=" sign, and the value appears after the "=" sign. It should be understood that other formats for name/value pairs may be used.

The parsed name/value pairs are examined at decision step 212. The examination includes inquiring whether the "value" of a name/value pair matches a pattern of known "special strings" that have been identified as not being search terms. If there is a match at decision step 212, then the pair is discarded from further consideration of whether the name/value pair may constitute a search engine term. For example, the value string "UTF-8" may be pre-selected as a special string value that should be discarded as well as the value strings "UTF8"

and "Google+Search". Accordingly, the following name/value pairs are discarded from consideration of being search terms:

ie=UTF-8
oe=UTF8
btnG=Google+Search

Figure 6:
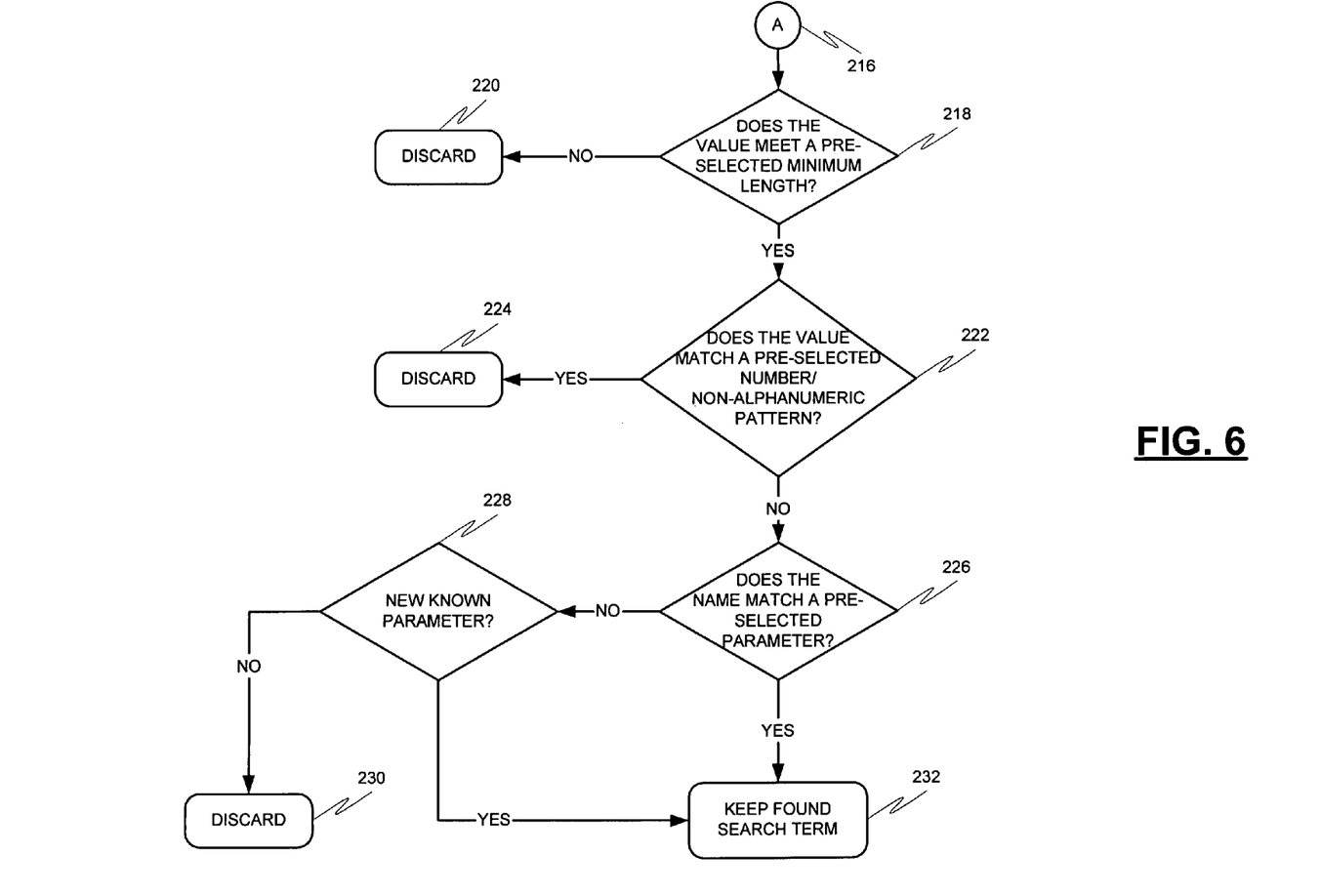

Processing continues on FIG. 6 as indicated by continuation marker 216. With reference to FIG. 6, decision step 218 examines whether a "value" meets a pre-selected minimum length requirement. As an illustration if the pre-selected minimum length requirement is a length of three characters, then a name/value pair whose value is "en" would not satisfy this requirement and accordingly this name/value pair would be discarded at 220.

Decision step 222 examines whether a "value" data item matches a pattern describing only numbers or non-alphanumeric characters. If it does, then the pair is discarded from consideration at 224.

For those pairs that have passed the aforementioned tests, those pairs are examined at decision step 226. Decision step 226 examines whether the "name" of the pair exists in a hash table of known search term parameter names. If the "name" is found within the hash table as determined by decision step 226, then the value data item of the name/value pair is determined to be a search term and is accordingly stored in the hash table as shown at 232.

Figure 8:
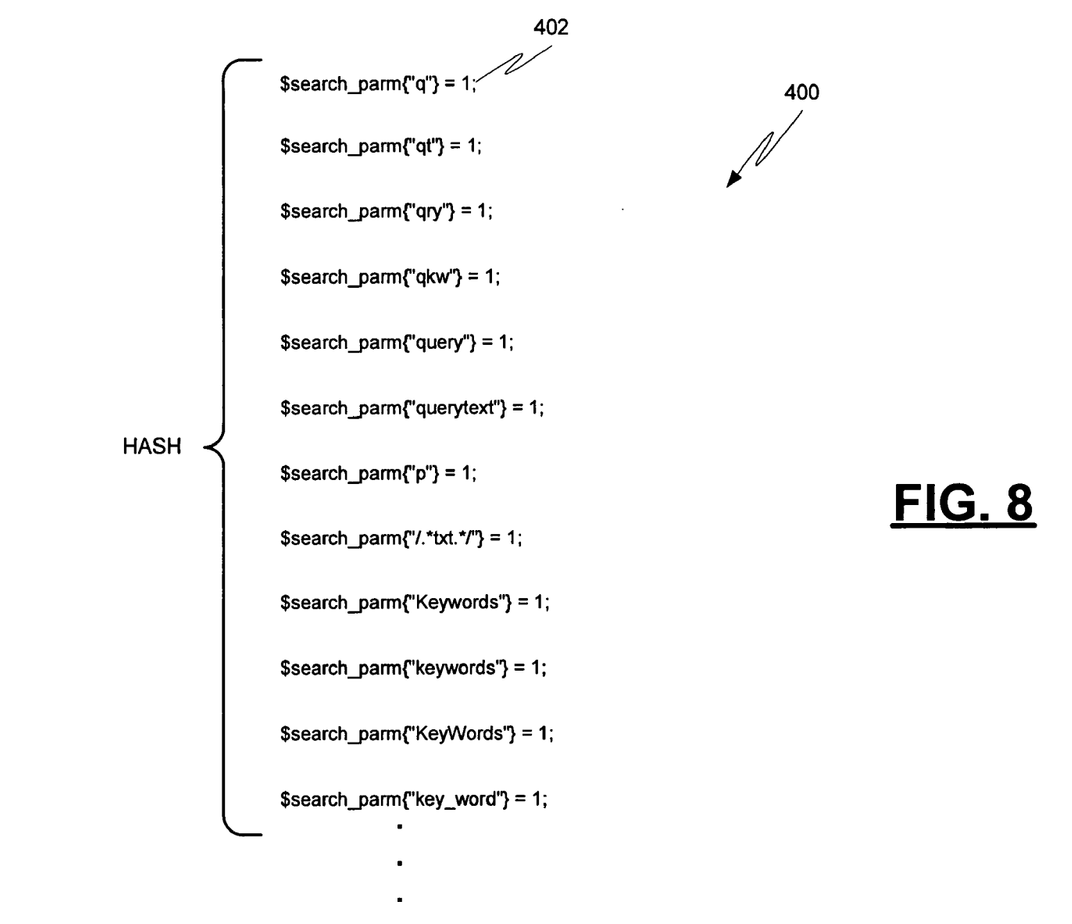
FIGS. 8 and 9 depict hashes for search term parameters.
Figure 9:
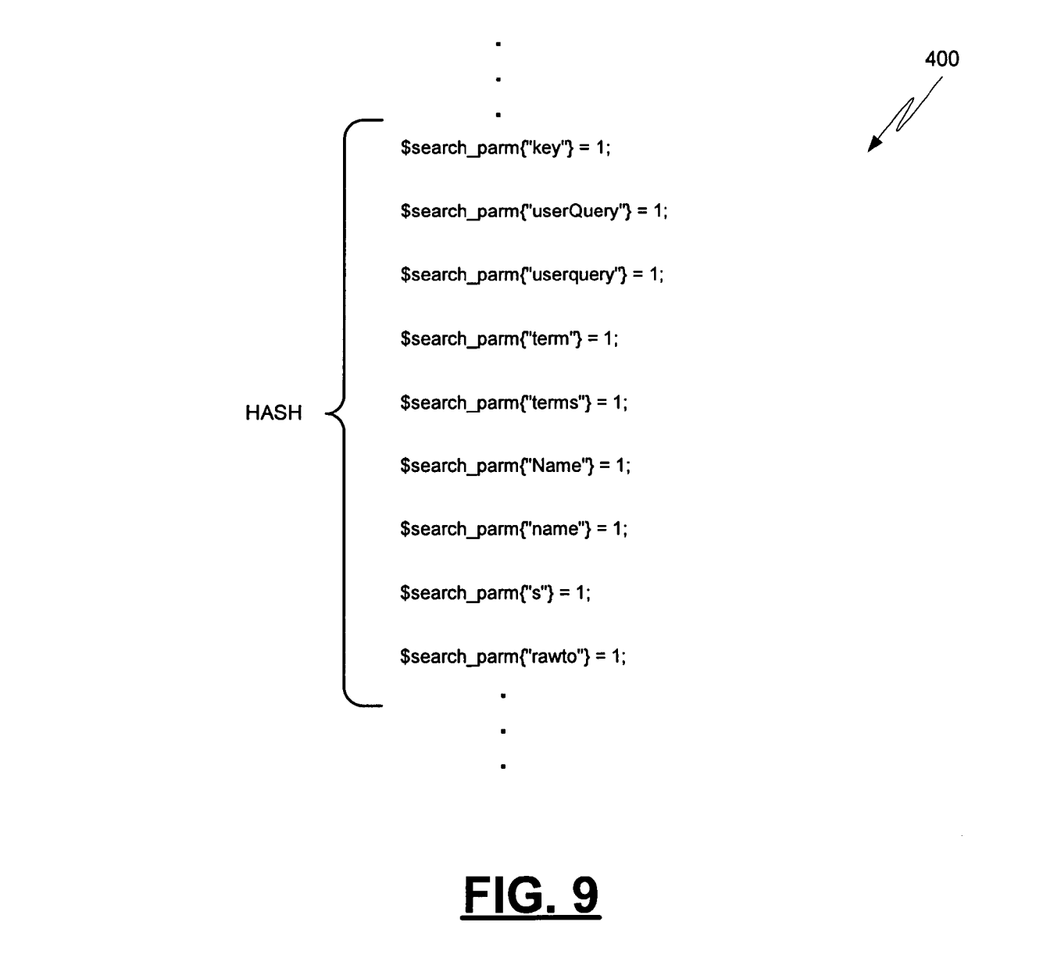

As an example, FIGS. 8 and 9 illustrate hashes for parameters that have been determined as containing (or most likely) containing search terms. As shown in FIG. 8 at 402, the search for the name "q" in the hash table 400 would return a positive result (e.g., a value of "1") which indicates that the name "q" was found in the hash table 400. Accordingly, the operational scenario results in determining that the actual search term has a name "q" with an actual search term value of "sas+software". The value can be further parsed to extract the keywords "sas" and "software" originally provided by the user to a referrer search engine. The referrer search engine is then associated with the extracted search for evaluation by another computer program or directly by a person, such as an e-business manager.

If a name had not been found in the hash table at decision step 226 but the name/value pair had passed one or more of the previous tests (e.g., tests 206, 212, 216, 222), then decision step 228 determines whether a new parameter name needs to be added to the existing hash table. If it is to be added, then the parameter name is added to the hash table; else the name is discarded as indicated at 230. This can be helpful in such situations as when a new search engine appears, in which case its search term name(s) can be automatically added to the hash table.

As shown by this example, multiple parameters that are not search terms can be provided with a query string. These include parameters in the string that indicate the designated language (e.g., the name/value pair "h1=en" would designate that the language is English). In general, different search engines insert different parameters in their respective query string, but as illustrated by the operational scenario, there is no need to verify whether the referrer is an already known to exist type of search engine. As a result there is no need to maintain a database of known search engines—that is, a priori knowledge is not required of what search engine(s) are involved. Such a search engine list can become out-of-date very quickly as new search engines arise each day. Accordingly, a new search engine that appears can have their search terms detected automatically without having to change the configuration of the extraction search program through human intervention.

While examples have been used to disclose the invention, including the best mode, and also to enable any person skilled in the art to make and use the invention, the patentable scope of the invention is defined by claims, and may include other examples that occur to those skilled in the art. For example, a system and method disclosed herein may be configured to handle new search engines and changes to existing search engines without having to maintain a search engine database and as a result the configuration would need less maintenance to ensure good quality results.

Also, both names and values can be checked in the indexed data store help ensure that search terms are properly captured. This can be helpful if the value of a name/value pair may appear to be a search term, but by analyzing the name of the pair, it can be determined that the value is not a search term.

Figure 10:
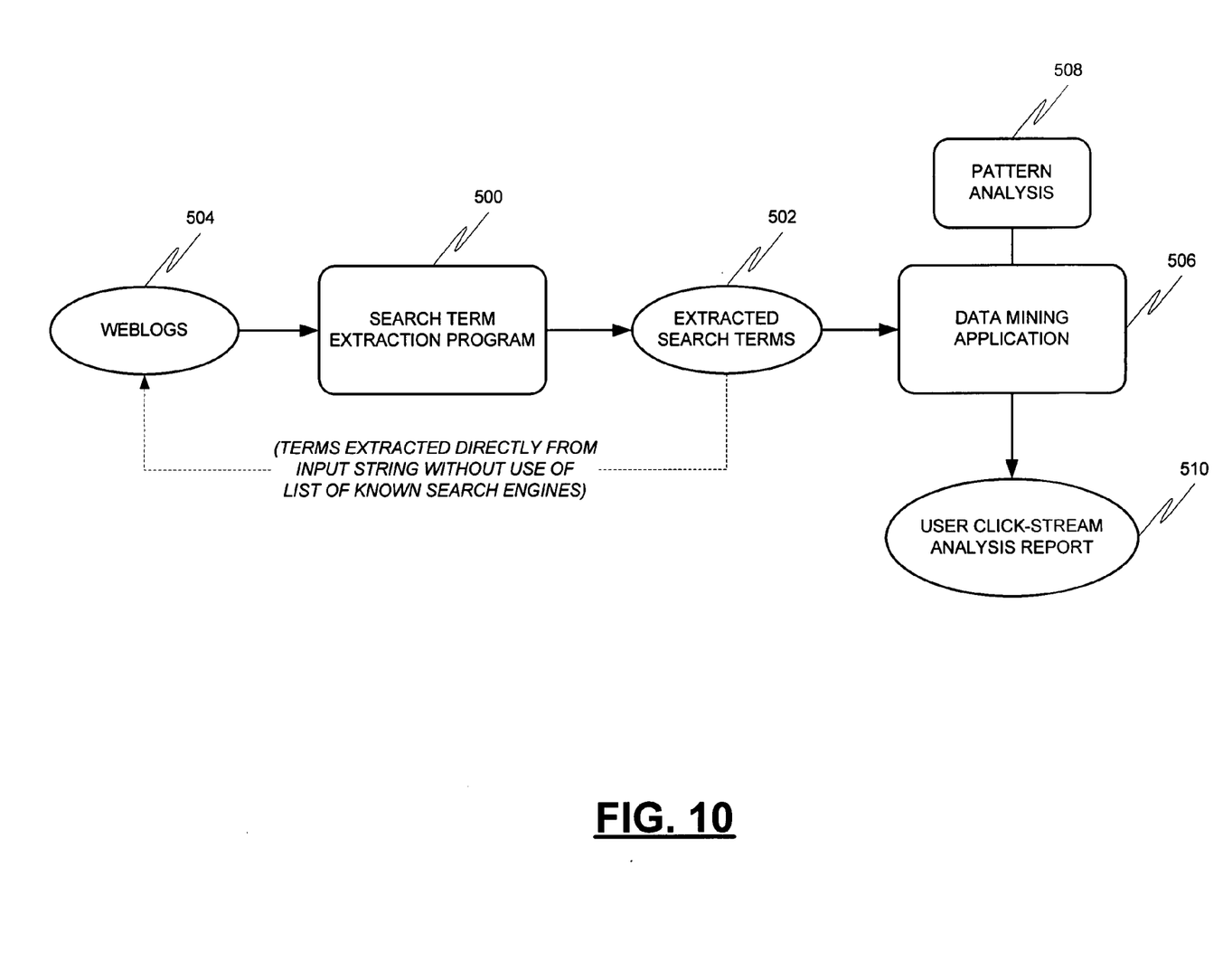
FIG. 10 is a block diagram depicting a search term extraction program being used to extract search terms from weblogs.

As yet another example of the wide scope of the systems and methods disclosed herein, the systems and methods may be utilized with many different applications. For example, FIG. 10 shows a search term extraction program 500 being used to extract search terms 502 from weblogs 504 (e.g., a web server log) which are then analyzed by a data mining application 506. (It should be understood that input search engine data can also be provided to an extraction program in real-time.) A data mining application 506 can use a pattern analysis algorithm 508 to determine customer purchasing habits or other patterns present in the extracted search terms.

The extraction program 500 can also be used with a web server log analysis tool for referrer information processing. Referrer information processing can indicate the quantity of visitor that are being received from which search engines, as well as the most popular keywords being used. To generate a list of search terms for referrer information processing, the extraction process by program 500 is performed directly from the weblogs' input strings without use of a list of known search engines.

Different data mining applications are available to handle such pattern analysis and other data mining analyses (e.g., referrer information processing). One example is the Enterprise Miner™ product available from the assignee of this patent document. Based upon the data mining application's analysis, a user click-stream analysis report 510 (e.g., search term report and pattern analysis) can be generated and provided to e-business web site managers and other personnel interested in the analysis of website activity. Such personnel can use the data to determine which keywords brought the most users to their website from a referring search engine.

Figure 11:
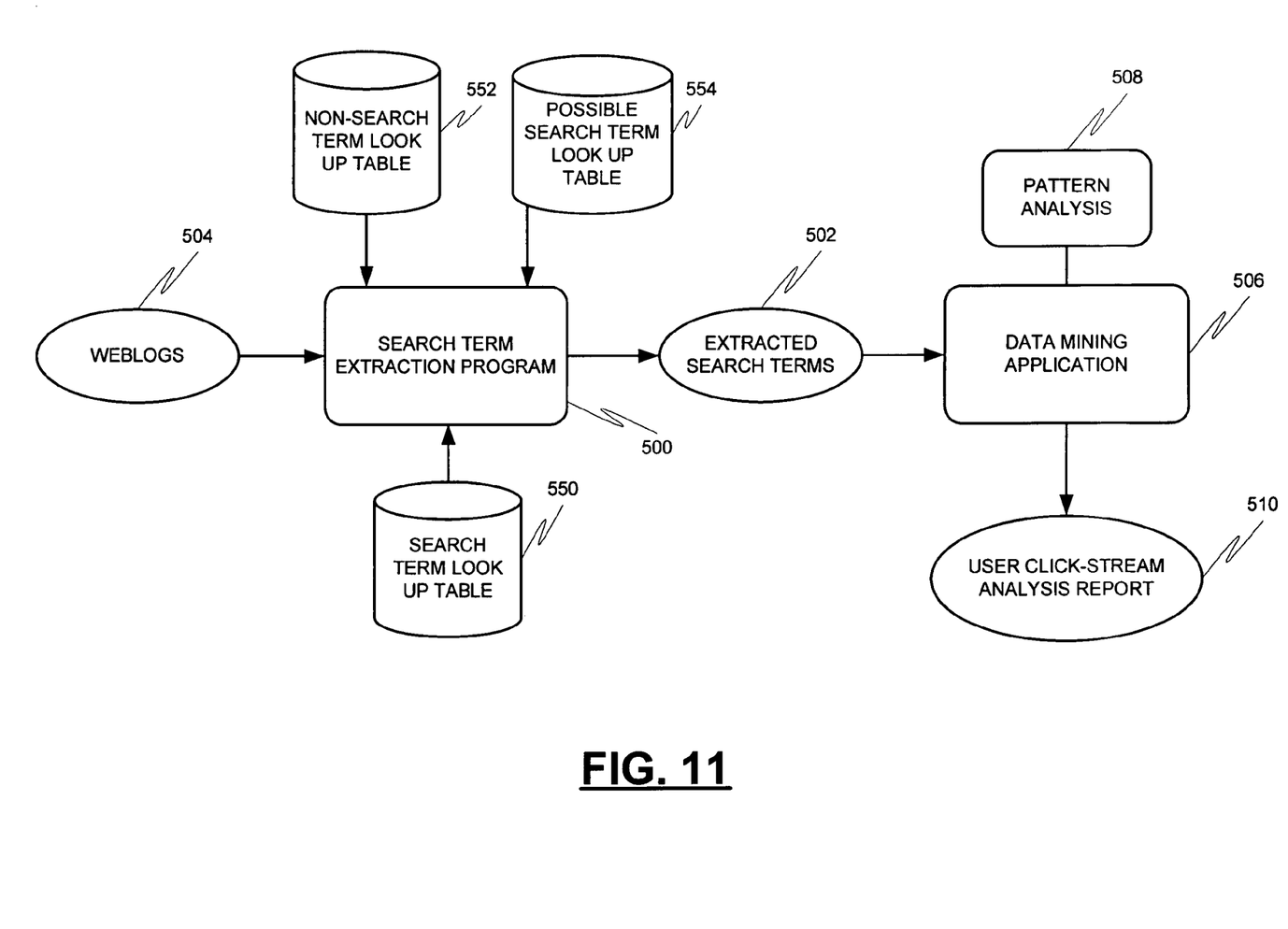
FIG. 11 is a block diagram depicting multiple look-up tables being used with a search term extraction program.

FIG. 11 shows that first and second look-up tables (e.g., B-tree tables, hash tables, non-indexed tables, etc.) can be used with a search term extraction program. The first look-up table 550 can contain a listing of known search terms, and the second look-up table 552 can contain a listing of known non-search terms. If a name or value appears in the first table 550, then it is considered to be a search term. If a name or value appears in the second table 552, then it is considered not to be a search term.

Such an approach can be further extended by including a third look-up table 554 which contains a list of data items that indicate the possibility of a data item in a query string being a search term. Terms in the third look-up table 554 could be combined with other tests to more fully ascertain whether the term in the query string is an actual search term.

The systems and methods disclosed herein may be implemented on various types of computer architectures, such as for example on a single general purpose computer or workstation, or on a networked system, or in a client-server configuration, or in an application service provider configuration. In multiple computer systems, data signals may be conveyed via networks (e.g., local area network, wide area network, internet, etc.), fiber optic medium, carrier waves, wireless networks, etc. for communication among multiple computers or computing devices.

The systems' and methods' data (e.g., associations, mappings, etc.) may be stored and implemented in one or more different types of computer-implemented ways, such as different types of data structures. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A method for operation upon a data processing device to determine which terms in a weblog are search terms, wherein the search terms are from different types of search engines, wherein the different types of search engines include a first type of search engine and a second type of search engine, the method comprising:

receiving, by using the data processing device, input search engine data from the weblog, wherein the input search engine data is a collection of search strings that are query inputs for use by the different types of search engines in performing queries to generate search results, the data processing device includes a memory;

wherein the input search engine data includes click-stream referrers;

using one or more data items contained within the input search engine data to search an indexed data store in the memory, wherein the indexed data store does not include a list of the different types of search engines;

determining which of the one or more data items are search terms by comparing a portion of a query input to data in the indexed data store;

extracting search terms from the input search engine data when the portion of the query input matches the data in the indexed data store, wherein the extracted search terms include a first search term and a second search term, the first search term comprising a query input to the first type of search engine, and the second search term comprising a query input to the second type of search engine;

wherein the indexed data store is a hash table containing pre-selected search term parameter names, and wherein the extracting the search terms from the input search engine data is based upon whether a data item from the input search engine data is found within the hash table;

wherein the input search engine data includes query strings formatted according to a hypertext transfer protocol, the query strings including name/value pairs associated with a referrer, and wherein data items used in searching the hash table include data items from the name/value pairs;

performing additional search engine tests upon data items from the input search engine data, the additional search engine tests including a test to determine whether a name data item matches a pattern of known search engines, a test to determine whether a value data item matches a pattern of known search strings that have been identified as not being search terms, a test to determine whether a value data item satisfies a pre-selected minimum length requirement, and a test to determine whether a value data item matches a pattern describing only numbers or non-alphanumeric characters;

updating the hash table with a data item that is not found within the hash table when one or more of the additional search engine tests were satisfied with respect to the data item that is not found within the hash table; and generating, by using the extracted search terms, a report indicating user searching profiles.

2. The method of claim 1, wherein the extracting the search terms from the input search engine data is search engine independent;
wherein at least two of the search engines are different types of search engines that use different formats and identifiers for search terms within respective query inputs, a query input including user input used by a search engine to perform a search; and
wherein the input search engine data includes the user input used by the search engine and stored in a weblog.

3. The method of claim 2, wherein the extracting the search terms obviates a need to verify that a referrer provided in the input search engine data is a known search engine.

4. The method of claim 3, wherein new types of search engines arise over time and the searching of the indexed data store is performed independently of type of search engine.

5. The method of claim 1, wherein the extracting the search terms is substantially independent of search engine type, and wherein the different types of search engines use different formats and identifiers for search terms within respective query inputs.

6. The method of claim 1, wherein the input search engine data includes click-stream data generated from one or more users of internet web pages.

7. The method of claim 1, wherein a data mining engine processes and analyzes the extracted search terms in order to determine the user searching profiles contained in the report.

8. The method of claim 1, wherein the report is used by e-business web site managers for analyzing website activity.

9. The method of claim 1, wherein the searching the indexed data store includes using data items generated by processing name/value pairs of a query string associated with a referrer.

10. The method of claim 9, further comprising:
comparing the name/value pairs to data stored in the indexed data store to determine whether a value should be considered a valid search term.

11. The method of claim 1, wherein the input search engine data includes a referrer, the method further comprising:
parsing the referrer to identify the query input;
parsing the query input into name/value pairs; and
using names or values as data items for searching the indexed data store to determine search terms.

12. The method of claim 1, wherein a look-up table containing a list of non-search terms is used to determine whether a data item is a search term.

13. The method of claim 12, wherein a look-up table containing a list of possible search terms is used to determine whether a data item is a search term.

14. A system for operation upon a data processing device to determine which terms in a weblog are search terms, wherein the search terms are from different types of search engines, wherein the different types of search engines include a first type of search engine and a second type of search engine, the system comprising:
a processor;
a memory containing instructions for use in execution by the processor to perform operations including:
receiving input search engine data from the weblog, wherein the input search engine data is a collection of search strings that are query inputs for use by the different types of search engines in performing queries to generate search results;
wherein the input search engine data includes click-stream referrers;
using one or more data items contained within the input search engine data to search an indexed data store, wherein the indexed data store does not include a list of the different types of search engines;
determining which of the one or more data items are search terms by comparing a portion of a query input to data in the indexed data store;
extracting search terms from the input search engine data when the portion of the query input matches the data in the indexed data store, wherein the extracted search terms include a first search term and a second search term, the first search term comprising a query input to the first type of search engine, and the second search term comprising a query input to the second type of search engine;
wherein the indexed data store is a hash table containing pre-selected search term parameter names, and wherein the extracting the search terms from the input search engine data is based upon whether a data item from the input search engine data is found within the hash table;
wherein the input search engine data includes query strings formatted according to a hypertext transfer protocol, the query strings including name/value pairs associated with a referrer, and wherein data items used in searching the hash table include data items from the name/value pairs;
performing additional search engine tests upon data items from the input search engine data, the additional search engine tests including a test to determine whether a name data item matches a pattern of known search engines, a test to determine whether a value data item matches a pattern of known search strings that have been identified as not being search terms, a test to determine whether a value data item satisfies a pre-selected minimum length requirement, and a test to determine whether a value data item matches a pattern describing only numbers or non-alphanumeric characters;
updating the hash table with a data item that is not found within the hash table when one or more of the additional search engine tests were satisfied with respect to the data item that is not found within the hash table; and
generating, by using the extracted search terms, a report indicating user searching profiles.

* * * * *